Nov. 9, 1937.   O. N. GREDELL   2,098,577
TANK
Filed July 16, 1934   2 Sheets-Sheet 2
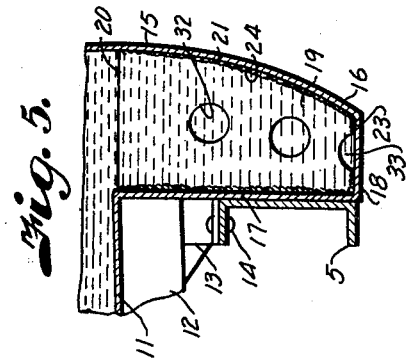
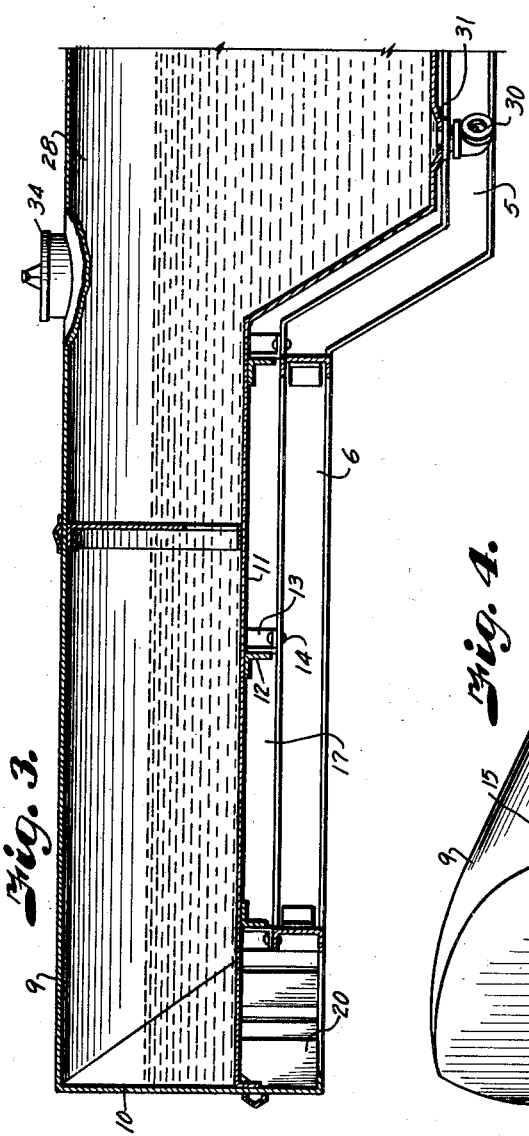
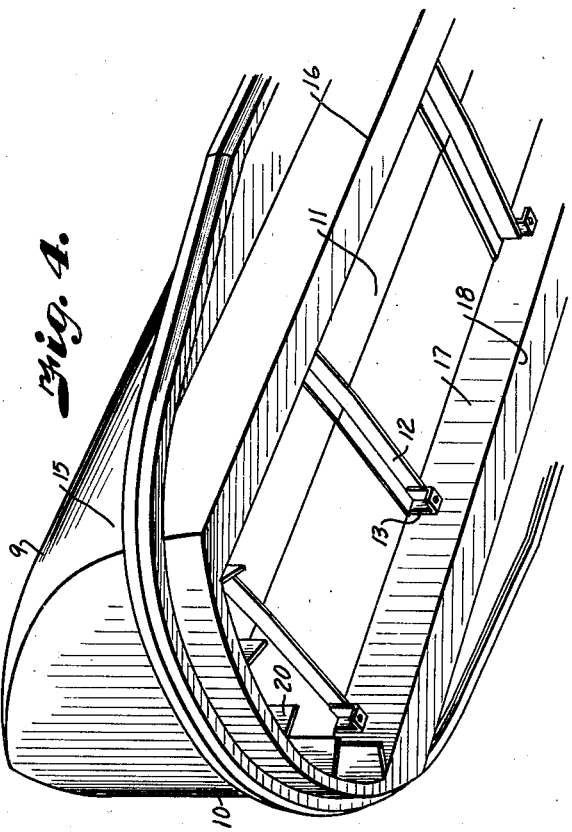
INVENTOR
Otto N. Gredell.
BY
Arthur Le Brown
ATTORNEY Patented Nov. 9, 1937

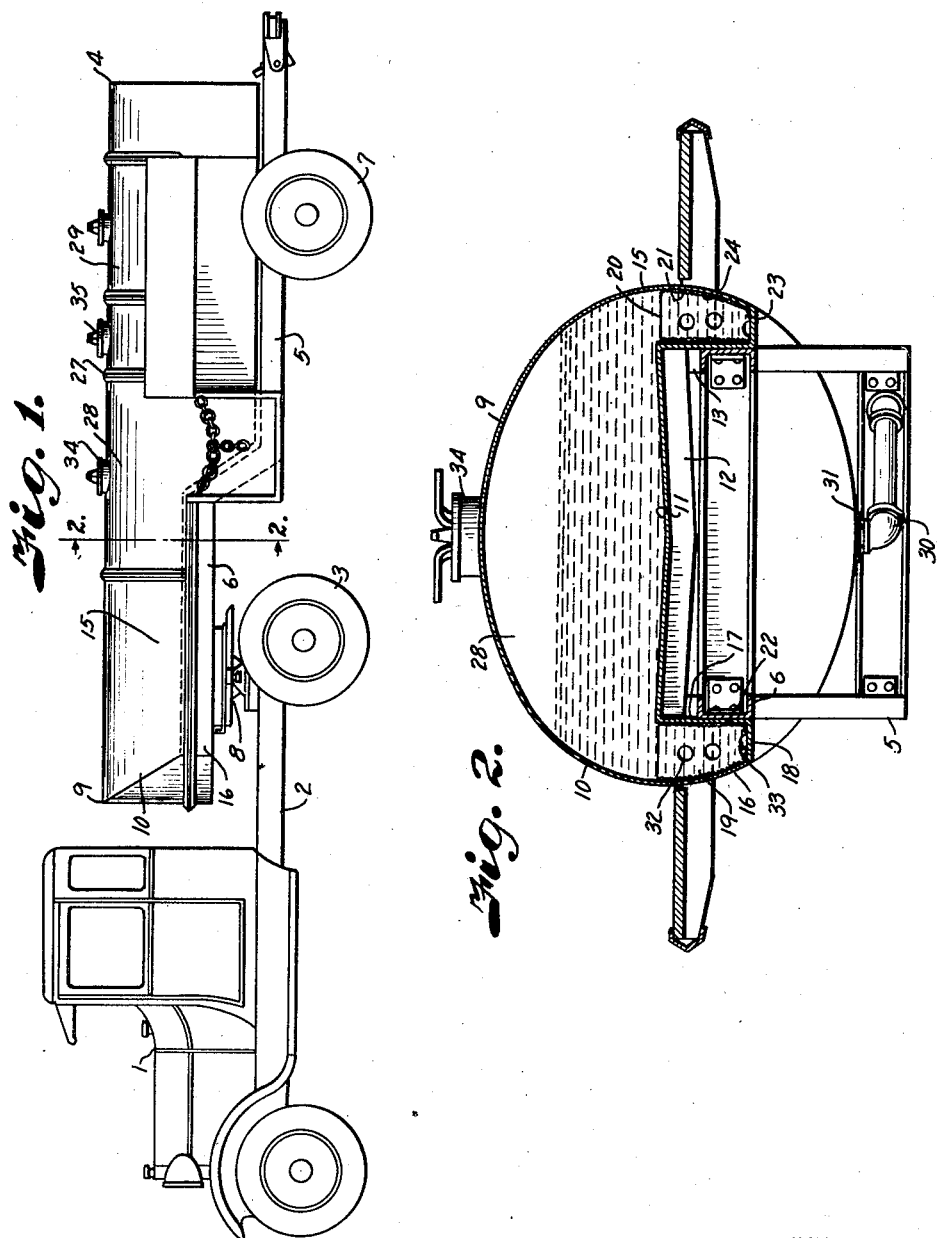

2,098,577

UNITED STATES PATENT OFFICE 2,098,577

TANK

Otto N. Gredell, Kansas City, Mo., assignor to Standard Steel Works, North Kansas City, Mo., a corporation of Missouri Application July 16, 1934, Serial No. 735,327

4 Claims. (Cl. 220—1)

This invention relates to tanks and more particularly to trailer truck tanks for partial support by a traction vehicle, and has for its principal objects to provide a tank having an offset bottom portion enclosed in a skirting to enhance the appearance thereof, to increase the strength of the offset portion, and to increase the liquid carrying capacity of a tank having a portion of reduced diameter.

In accomplishing these and other objects of the invention, I have provided improved details of structure, the preferred forms of which are illustrated in the accompanying drawings, wherein:

Fig. 1 is a side elevation of a truck chassis equipped with a trailer truck tank constructed in accordance with my invention and having its front end mounted on the chassis.

Fig. 2 is a section on the line 2—2, Fig. 1.

Fig. 3 is a longitudinal central section of the front of the tank having the offset bottom and showing the skirting.

Fig. 4 is an enlarged perspective view of the front end of the tank.

Fig. 5 is an enlarged fragmentary section of the lower edge of the front end of the tank, illustrating the skirt portion forming an additional container space.

Referring more in detail to the drawings:

1 designates an automobile vehicle such as a truck chassis including a frame comprising longitudinal horizontal sills 2, and wheels 3.

4 designates a trailer truck comprising a frame including longitudinal channels or sills 5 having front portions 6 upwardly offset intermediately the ends of the sills, and wheels 7 adapted to support the rear portions of the sills substantially in alignment with the sills of the chassis 1.

The offset front portions of the trailer sills are adapted to project over the chassis, and means such as an ordinary fifth wheel device 8 is provided for supporting the front end of a tank 9 on the chassis.

The tank 9 is constructed of sheet metal conformable to the shape of the frame, and includes a front section 10 having less vertical diameter than the rear portion, the bottom 11 of the front section being upwardly offset from the bottom line of the rear portion so that it may rest on the offset front ends of the trailer sills.

The rear or normal section of the tank may be mounted in any approved fashion on the relatively low portion of the trailer frame.

The front elevated section of the tank is preferably supported by cross plates or angle bars 12 fixed to vertical angles 13 secured to the sills as by rivets 14 and extending upwardly therefrom.

The side walls 15 of the tank section 10 preferably extend downwardly and arcuately below the bottom to form wings or depending wall portions 16. The bottom 11 is of less width than the spacing between the depending wall portion 16 and terminates in alignment with the outer side of the sills in downwardly extending side portions 17 that are connected with the lower edges of the depending wings 16 by connecting portions 18 to form chamber-like recesses or troughs 19 communicating with the interior of the tank section for increasing the capacity thereof.

The front tank section projecting laterally beyond the sills may then be stabilized in sill-supported position by gusset-like plates 20 having outer arcuate edges 21 engaging the inner surfaces of the depending wall portions 16, inner vertical edges 22 engaging the inner surfaces of the portions 17, and lower horizontal edges 23 engaging the bottom portions 18 of the tank section. The edges may be welded to the engaging portions of the tank, as indicated at 24.

The tank may be divided into a plurality of compartments by transverse partitions 27, the first of which is located preferably to the rear of the off-setting portion 26 of the bottom of the tank to form a front compartment 28 at the front end of the tank and rear compartments 29 in the normal section of the tank.

Discharge conduits 30 are connected with sumps 31 formed in the bottoms of the respective compartments for draining liquid therefrom. Liquid may be drained from the chamber-like recesses 19 through openings 32 and lower edge openings 33, that are provided in the gusset-like plates 20, into the lower portion of the compartment 28. Inlets 34 and 35 are provided for introducing liquids to the several compartments.

In apparatus constructed as described, the normal and relatively large section of the tank is supported at a relatively low elevation on the two-wheeled running gear of the trailer, while the reduced front end of the tank with its offset bottom is supported on the rear end of the traction vehicle, thus contrasting with ordinary practice in which a symmetrical elongated tank is supported with its rectilinear bottom elevated to the level of the support on the rear end of the traction vehicle, and the entire tank is unduly elevated.

In the construction shown, the top portion of the tank presents a symmetrical appearance, its top extending rectilinearly from the front end to the rear end.

The depending wings 16 form skirts for increasing the effective depth of the reduced portion of the tank to enhance the appearance thereof and they cooperate with the portions 17 and 18 to provide additional container space.

What I claim and desire to secure by Letters Patent is:

1. A tank of the character described including a reduced front end portion having a depending hollow skirt forming continuations of the sides of said reduced front end portion.

2. A tank having substantially elliptical cross-section including a forward portion having a bottom offset upwardly from the remaining portion of the tank and having depending side portions spaced inwardly from depending side portions of the offset, and means connecting said depending portions to form side compartments having communication with said offset portion of the tank.

3. A tank having substantially elliptical cross-section including a forward portion having a bottom offset upwardly from the remaining portion of the tank and having depending side portions spaced from depending side portions of the offset, means connecting said depending portions to form side compartments having communication with said offset portion of the tank, and gusset plates connecting said depending portions.

4. A tank having substantially elliptical cross-section including a forward portion having a bottom offset upwardly from the remaining portion of the tank and having depending side portions spaced from depending side portions of the offset, means connecting said depending portions to form side compartments having communication with said offset portion of the tank, and gusset plates connecting the depending portions having flow openings therethrough for passage of liquid through the gusset plates.

OTTO N. GREDELL.